Oct. 25, 1960    M. A. STEINBERG    2,957,235

METHOD OF JOINING POWDER METAL PARTS

Filed March 12, 1957

MORRIS A. STEINBERG
INVENTOR.

BY Lawrence J. Winter
ATTORNEY

2,957,235

METHOD OF JOINING POWDER METAL PARTS

Morris A. Steinberg, University Heights, Ohio, assignor to Purolator Products, Inc., Rahway, N.J., a corporation of Delaware Filed Mar. 12, 1957, Ser. No. 645,484

13 Claims. (Cl. 29—424)

The present invention relates to powder metal filters and more particularly to a method of joining the powder metal filter parts to one another.

One of the more recent developments in the filter industry is the use of sintered materials such as metals in the manufacturing of filters. Sintered metal elements are especially desirable when certain characteristics of strength, temperature resistance, or corrosion resistance are required. They are usually made by conventional sintering processes resulting in a porous sheet or membrance which may be formed into any desired shape such as tubes, discs, cones or other simple shapes. One highly efficient shape is a filter element formed of sintered materials in which the filtering surface is pleated or convoluted. As can be readily seen, this increases the surface area available for filtering without increasing the volume occupied by the filter. Such a filter element may be made by simple molding or extrusion of the powdered metal after it is properly mixed with a binder and a solvent and before it is sintered into its final form. One method of producing such a sintered metal filter element is disclosed in U.S. patent application Serial No. 515,010, filed June 13, 1955 now abandoned by Julius P. Kovacs and Dr. Eugene Wainer.

The present invention is concerned primarily with joining the powdered metal parts of such a filter element to one another, for example, the end discs to the main body member of the element, since a convoluted or pleated body member having an end disc closing one end thereof cannot be formed by simple molding or extrusion, but the end cap must somehow be joined to the body member at a later time. Heretofore, an end cap has been joined to the body member by using an adhesive therebetween, or by placing the body member on the end cap during the sintering operation, and also by fusing or welding the body member and the end cap to one another until they form a solid joint. When an adhesive has been used to join the sintered metal body member and end cap to one another this has formed the weakest part of the element structurally and has thereby reduced the effective strength of the filter element. In joining the body member to the end cap by merely placing the body member upon the end cap during the sintering operation, the resin binder has tended to melt and the prefabricated parts of the element have tended to lose shape upon heating the element, resulting in defective elements of non-uniform porosity. When the body member has been welded or fused to the end cap before the sintering operation again the resin binder has tended to melt so the element loses shape, also resulting in a defective element.

An object of the present invention is to provide a method to join prefabricated elements of powder-resin mixtures to one another which avoids the above mentioned difficulties.

Another object of the present invention is to provide a method to join prefabricated elements of powder-resin mixtures to one another so as to permit fabrication of complex shapes not amenable to being formed by simple molding or extrusion.

A still further object of the present invention is to provide a method to join prefabricated elements of powder resin mixtures to one another wherein the heat applied during the joining process is controlled over a localized area so that the resin binder will not deteriorate sufficiently to cause the prefabricated element to lose shape.

Another object of the present invention is the provision of a novel method of joining a prefabricated powder-resin mixture part of an element to a solid part of an element.

The invention will be better understood from the following description when considered in connection with the accompanied drawing forming a part thereof and in which.

Figure 6:
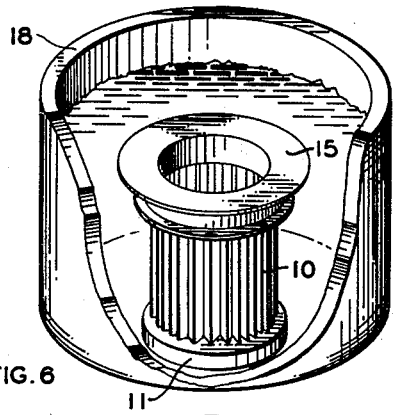
Fig. 6 illustrates the quenching step embodied in the present invention.
Figure 7:
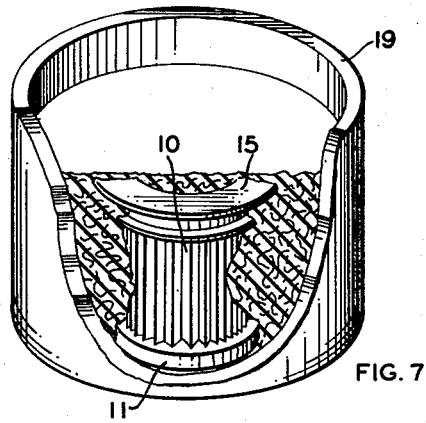
Fig. 7 represents the prefabricated parts joined to one another in accordance with the present invention and ready to be sintered to form a porous filter element.

Referring to the drawing, the reference numeral 10 designates a preformed convoluted tubular body member comprised of a mixture of powdered metal, a binder material, solvent and wax. The binder material is preferably polystrene resin, the solvent, xylene, and the wax a medium melting point wax which is fairly hard at room temperature and has good lubricating properties at extrusion temperature. Body member 10 may be preformed by a simple molding operation or extrusion process to form the convolutions or pleats therein. The binder serves the purpose of maintaining the powdered metal particles out of contact with one another until the elements are sintered to form a filter element, as hereinafter described, while at the same time keeping the metallic particles properly positioned until the sintering operation. The reference numeral 11 designates a circular member or flat disc composed of the same material as body member 10 and adapted to form a porous closure or end cap for the member 10 in the fabrication of a filter element.

Figure 2:
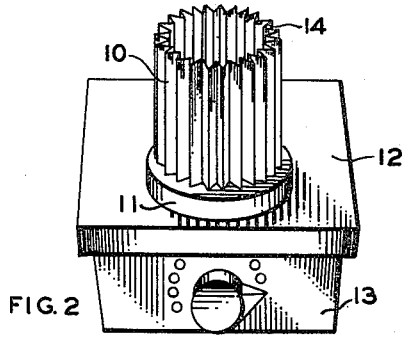
Fig. 2 illustrates the preformed members shown in Fig. 1 being joined to one another in the heating step embodied in the present invention.
Figure 3:
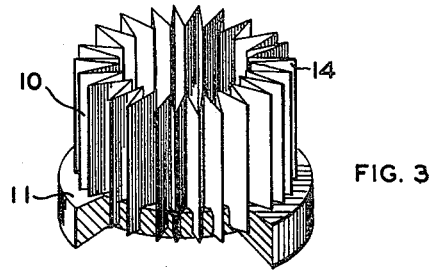
Fig. 3 is an enlarged fragmentary view, partly broken away, of the elements of Fig. 2 showing in an exaggerated manner how one element is embedded in the other element after the heating step of the present invention.
Figure 1:
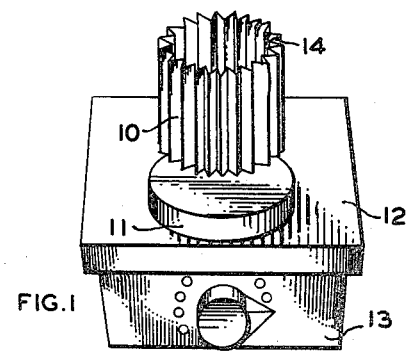
Fig. 1 illustrates prefabricated parts before they are joined to one another in accordance with the method of the present invention.

In joining the tubular member 10 to the end cap 11, the cap is placed on the heating plate or metal surface 12 of a heating apparatus 13. Apparatus 13 is placed in operation to heat end cap 11 so that the resinous material therein becomes soft or plastic. Thereafter, the end of body member 10 is pressed against the heated cap 11 (see Fig. 2) until a bond is obtained between the resinous material of the end cap and the resinous material in the portion of body member 10 in contact with and adjacent the end cap. The temperature of the heating apparatus is controlled at this time to maintain a temperature of approximately 200° C. It has been found that only a few seconds are required to obtain a fillet of the desired geometry at this temperature. Fig. 3 illustrates in an exaggerated manner the end of body member 10 embedded in the soft plastic disc after heating is completed and a bond is obtained between the resinous material in the disc and body element. When preformed body member 10 and disc 11 are heated in this manner to join them together it is possible to control the amount of heat applied over a localized area so that the resinous material will not melt sufficiently to cause the prefabricated body member and disc to lose shape by the powdered metal in the mixture falling away. This commonly occurs when the body member and end cap are joined together by welding or during the sintering operation and results in a nonuniform porosity in the finished product adjacent the jointure. If desired, end cap 11 may be preformed with grooves or slight depressions therein in which the body member is adapted to seat when pressed thereagainst when being joined to the end cap.

Thereafter body member 10 is ready to be pressed against a solid annular flange or disc 15 which forms the outlet end of the finished filter element assembly. Disc 15 is provided with an annular trough or ring 16 adjacent the inner circumference thereof which is filled with a layer or coating 17 of powdered metal, binder material, solvent and wax, similar to that comprising the tubular member 10 and disc 11.

Figure 4:
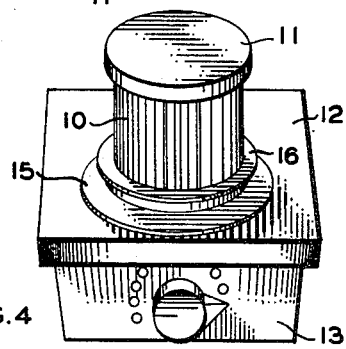
Fig. 4 illustrates the heating step embodied in the present invention for joining a porous part to a solid part.
Figure 5:
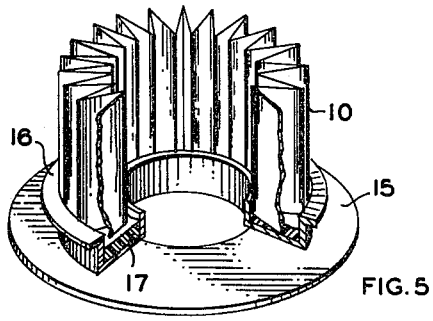
Fig. 5 is an enlarged fragmentary view, partly broken away, of a porous part after it is joined to a solid part in the heating step shown in Fig. 4.

The solid disc or flange 15 is placed on the heating apparatus 13 as shown in Fig. 4, heat is supplied to surface 12 of the apparatus until the temperature reaches approximately 200° C., and end 14 of the body member 10 is pressed against layer 17 of the mixture so as to obtain a bond between the resin in layer 17 and the resin adjacent end 14 of the body member 10. Fig. 5 illustrates end 14 after it has been bonded to disc 15.

Thereafter the entire assembly is cooled to room temperature by immersing or quenching it in a container 18 filled with water as shown in Fig. 6.

The body member and end caps now form a filter assembly that is placed in a sintering apparatus 19 packed with alumina setter for supporting the assembly during sintering, and is sintered in any conventional manner to form a porous sintered metal filter element having a uniform porosity throughout, and particularly in the vicinity where the end caps are joined to the main body portion.

Thus, the present invention provides a novel method of joining prefabricated elements of powder resin mixtures to one another, or a prefabricated element of a powder resin mixture to a solid element, which prevents the prefabricated elements from losing shape by controlling the heating of the resinous material over a local area so the resinous material in the prefabricated elements bond to one another without collapse of the element.

A modified form of the present invention comprises joining body member 10 to end caps 11 and 15 in the same manner as hereinbefore described, except that body member 10 is first sintered before being pressed against the heated caps. During the heating step of this method, the resinous material in the end caps becomes soft enough to fill the minute pores or openings in the sintered member 10 so that it bonds to the end caps as already described. Thereafter, the assembled structure is quenched and placed in apparatus 19 for sintering, as before, to form a sintered filter member of uniform porosity.

Inasmuch as various changes may be made in the steps of the process and other sequences as disclosed without departing from the principles of the invention, it will be understood that the invention is not to be limited excepting by the scope of the appended claims.

What is claimed is:

1. The method of assembling first and second elements composed of a mixture of powdered metal and resinous binder comprising placing said first element on a support, heating said first element until said resin binder therein becomes pliable without the element losing shape, placing said second element against said first element, applying pressure to said second element until a bond is formed by the resinous binder between said first and second elements, removing the elements from said support, cooling the assembly of said elements, supporting said assembly with setter material in a sintering zone, and sintering said assembly into a unitary sintered structure.

2. The method of claim 1 wherein said first element is heated to approximately 200° C. and said second element is pressed against said first element for several seconds.

3. The method of assembling a first porous sintered element and a second element composed of a mixture of powdered metal and a resinous binder comprising placing said second element on a support, heating said second element until said resinous binder therein becomes pliable without the element losing shape, pressing said first element against said second element until a bond is formed by the resinous binder between said elements, removing the elements from said support, cooling said elements, supporting said assembled elements with setter material in a sintering zone, and sintering said elements into a unitary sintered structure.

4. The method of claim 3 wherein said second element is heated to approximately 200° C. and said first element is pressed against said second element for several seconds.

5. The method of joining a first element composed of a powdered metal resin binder mixture to a second element having a portion thereof composed of the same mixture, comprising placing said second element on a support, heating said second element until said resinous binder therein becomes pliable without the element losing shape, pressing said first element against said second element until a bond is formed between the resinous binder in said elements, removing the elements from said support, cooling said elements, supporting said assembled elements with setter material in a sintering zone, and sintering said elements into a unitary structure.

6. The method of claim 5 wherein said second element is heated to approximately 200° C. and said first element is pressed against said second element for several seconds.

7. The method of joining a first porous sintered element to a second solid element having a portion thereof composed of a mixture of powdered metal and a resinous binder, placing said second element on a support, comprising heating said second element until the resinous binder therein becomes pliable without the element losing shape, pressing said first element against said second element until a bond is formed by the resinous binder between said elements, removing the elements from the support, cooling said element, supporting said assembled elements with setter material in a sintering zone, and sintering said elements into a unitary structure.

8. The method of claim 7 wherein said second element is heated to approximately 200° C. and said first element is pressed against said second element for several seconds.

9. The method of assemblling a sintered metal body member of a filter to a powdered metal resin mixture end member comprising placing said end member on a support, heating said end member until the resinous binder therein becomes pliable without the element losing shape, pressing the end of said body member against said end member until a bond is formed by the resinous binder between said members, removing said members from the support, cooling said members, supporting said assembled members with setter material in a sintering zone, and sintering said members into a unitary structure.

10. The method of joining a convoluted sintered metal body member of a filter to a solid annular end member having a trough thereon with a layer of powdered metal resin mixture therein, comprising placing the end member on a support, heating the solid end member until said resinous binder becomes pliable without the element losing shape, pressing the end of said body member against said layer until a bond is formed by the resinous binder between said members, removing said members from the support, cooling said members, supporting said assembled members with setter material in a sintering zone, and sintering said members into a unitary structure.

11. The method of joining a cylindrical body member of a filter composed of a powdered metal resin mixture to a solid end member having an annular trough with a layer of powdered metal resin mixture therein, comprising placing the end member on a support, heating said end member until the resinous binder therein becomes pliable without said member losing its shape, and pressing the end of said body member against said layer until a bond is formed by the resinous binder between said members, removing said members from the support, cooling said members, supporting said assembled members with setter material in a sintering zone, and sintering said members into a unitary structure.

12. The method of joining a body member of a filter composed of powdered metal resin mixture to an end member composed of powdered metal resin mixture comprising placing said end member on a support, heating said end member until said resinous binder therein becomes pliable without the end member losing shape, placing said body member against said end member, applying pressure to said body member until a bond is formed by the resinous binder between said members, removing the members from the support, cooling the assembly of said members, supporting said assembly with setter material in a sintering zone, and sintering said assembly into a unitary sintered structure.

13. The method of joining a sintered metal body member of a filter to an end member composed of a powdered metal resin mixture and another end member composed of a solid annular flange having an annular trough with a layer of powdered metal resin mixture therein, comprising placing said end member on a support and heating it until the resinous binder therein becomes pliable without the member losing shape, pressing one end of the body member against said end member until a bond is formed by the resinous binder between the body and end member, removing the assembled parts from said support, placing said other end member on said support and heating it until the resinous binder therein becomes pliable without the member losing shape, pressing the other end of the body member against said other end member until a bond is formed by the resinous binder between said body and other end member, removing the assemlbed parts from said support, cooling the body and end members, supporting said assembly with setter material in a sintering zone, and sintering said assembly into a unitary sintered structure.

References Cited in the file of this patent

UNITED STATES PATENTS

| | | |
|---|---|---|
| 1,200,992 | Searles | Oct. 10, 1916 |
| 1,757,846 | Schroter | May 6, 1930 |
| 2,459,513 | Flaws | Jan. 18, 1949 |
| 2,676,435 | Gillman | Apr. 27, 1954 |
| 2,679,913 | Scott | June 1, 1954 |
| 2,725,265 | Daniels et al. | Nov. 29, 1955 |

FOREIGN PATENTS

| | | |
|---|---|---|
| 417,661 | Great Britain | Oct. 8, 1934 |
| 558,124 | Great Britain | Dec. 22, 1943 |